United States Patent [19]
Luebke et al.

[11] Patent Number: 5,949,207
[45] Date of Patent: Sep. 7, 1999

[54] AUTO WINDOW SWITCH AND OBSTACLE DETECT/PROTECT WITH OVERRIDE

[75] Inventors: Charles J. Luebke, Sussex; Bernd E. Rehm, West Bend; Dale L. Gass, Brown Deer, all of Wis.

[73] Assignee: Eaton Corporation, Cleveland, Ohio

[21] Appl. No.: 08/922,586

[22] Filed: Sep. 3, 1997

[51] Int. Cl.$^6$ ................................... G05B 5/00
[52] U.S. Cl. ................ 318/446; 318/468; 318/475
[58] Field of Search .................. 318/280, 283, 318/445, 446, 466–470, 475–477, 484, 487; 307/10.1

[56] References Cited

U.S. PATENT DOCUMENTS

| | | | |
|---|---|---|---|
| 4,143,367 | 3/1979 | Schestag | 340/540 |
| 4,944,116 | 7/1990 | Mewald | 49/27 |
| 5,099,091 | 3/1992 | Kokubu | 200/5 B |
| 5,138,182 | 8/1992 | Kokubu | 307/10.1 |
| 5,285,136 | 2/1994 | Duhame | 318/266 |
| 5,329,163 | 7/1994 | Satoh et al. | 307/10.1 |
| 5,412,297 | 5/1995 | Clark et al. | 318/468 |
| 5,426,275 | 6/1995 | Maeda et al. | 200/553 |
| 5,488,276 | 1/1996 | Nishibe | 318/473 |
| 5,510,583 | 4/1996 | Pescetto | 200/1 B |
| 5,598,918 | 2/1997 | Malecke et al. | 200/558 |
| 5,621,290 | 4/1997 | Heller et al. | 318/466 |
| 5,661,385 | 8/1997 | McEwan | 318/478 |
| 5,780,985 | 7/1998 | Bickley et al. | 318/460 |

Primary Examiner—Brian Sircus
Attorney, Agent, or Firm—Fay, Sharpe, Beall, Fagan, Minnich & McKee, LLP

[57] ABSTRACT

A control system and method for operating an automobile window to provide anti-trap protection in an AUTO UP mode, wherein a switch assembly communicates switch signals representative of operator commands by disposition in distinct positions. A sensor that detects when an object is trapped between the window and the frame, and transmits an anti-trap signal representative thereof. A logic circuit receives the switch signals and the anti-trap signal and controls the drive assembly for the window in response thereto. The switch assembly includes a switch to override the anti-trap sensor for closing the window even when an obstruction is sensed during the closing operation.

15 Claims, 8 Drawing Sheets

AUTO WINDOW SWITCH AND OBSTACLE DETECT/PROTECT WITH OVERRIDE

BACKGROUND OF THE INVENTION

The subject invention pertains to the art of control systems, particularly automotive control systems, and is specifically directed to switch systems for power opening and closing the window of an automobile.

The invention is applicable to a simple and convenient switch system which accommodates anti-trap protection in the closing of an automobile window, yet includes override of the anti-trap protection to allow for a deliberate closing of the window even when an obstruction is present. However, it will be appreciated by those skilled in the art that the invention could be readily adapted for use in other environments, as for example, where similar anti-trap systems are employed to protect against potentially dangerous accidental closings where such anti-trap protection needs to be disabled in certain circumstances.

Conventional automobile power windows comprise a switch control wherein raising the window for closure requires a "manual" operation wherein the up switch must be manually held in an activated state to power the window motor. When this switch is released by an operator, window movement ceases. Typically, the switch is disposed on an arm rest or side panel of the door framing the window, but it is also well known to dispose switch controls for non-driver windows at the driver location. The problem with such manual switch systems is that they require a portion of the operator's physical and mental attention during their operation and so present somewhat of a safety concern. Ease of use and convenience are also design goals.

Automatic modes of window operation have been limited to an automatic down ("AUTO DOWN") wherein special operation of the control switch will allow the operator to manually release the switch while signaling that the window should continue with the opening operation. The AUTO DOWN mode permits the vehicle operator to fully open the window with minimal mental and physical attention. Known modes initiating such AUTO DOWN functions are a second detent in the switch assembly, or a time based switching including a short tap or an extended tap.

The advantages of an AUTO DOWN mode would similarly apply to an AUTO UP mode. Unfortunately, AUTO UP also involves a serious safety concern when the window proceeds to closure for a portion of the time without direct operator supervision. It is reasonably foreseeable that a passenger or an object could be accidentally pinched between the window and its peripheral seal. Where the most likely candidate for such a pinching result is the hand or fingers of a child, thus has an unacceptable risk as a commercially feasible design feature.

The present invention contemplates a new and improved switch control system that can provide an AUTO UP mode for window operation, with both an anti-trap system for detecting and protecting an obstruction during window closure in MANUAL UP or AUTO UP modes and also an override of the anti-trap system to provide for manual closure even when an intended obstruction is present.

BRIEF SUMMARY OF THE INVENTION

In accordance with the present invention, there is provided a control system for an automobile window including anti-trap protection in an AUTO UP mode. The new control system comprises a motorized drive assembly for driving the window between open and closed, a sensor to detect when an object is present between the window and the frame and to transmit an anti-trap signal representative thereof, a switch assembly for communicating switch signals representative of operator commands by disposition in selected modes via distinct positions and/or time intervals, and a logic circuit disposed to receive the switch signals and anti-trap signal and control the drive assembly in response thereto. The switch assembly comprises a switch movable to said distinct modes based upon positions and/or time intervals comprising an OFF mode, a MANUAL DOWN mode, an AUTO DOWN mode, an AUTO UP mode with anti-trap enabled and a MANUAL UP mode with anti-trap disabled.

In accordance with another aspect of the present invention, the switch assembly comprises first and second switches physically spaced from each other. The first switch comprises the AUTO DOWN mode, the OFF mode and the AUTO UP mode with anti-trap enabled. The second switch comprises the MANUAL DOWN mode, the OFF mode and the MANUAL UP mode with anti-trap disabled.

In accordance with a further aspect of the present invention, the switch has detent positions corresponding to the distinct modes, wherein a detent for said AUTO UP mode with anti-trap enabled is interposed between an OFF detent for said OFF mode and a MANUAL UP detent for said MANUAL UP mode with the anti-trap disabled. The MANUAL UP detent requires a higher operator force to reach actuation than the AUTO UP detent position.

In accordance with yet another more limited aspect of the present invention, the switch includes means for maintaining the switch in the AUTO UP position until the window closes or the window encounters an obstacle, the anti-trap signal being then transmitted and the window reversing for a predetermined distance.

In accordance with yet another more limited aspect of the present invention, an override switch selectively disables the anti-trap operation when the switch is disposed in the MANUAL UP mode with anti-trap. The override switch includes an indicator indicating the disabling of the anti-trap operation.

In accordance with yet another more limited aspect of the present invention, the switch has detent positions corresponding to the distinct positions. The detent positions comprise an OFF detent, a first MANUAL UP detent with anti-trap enabled, an AUTO UP detent with anti-trap enabled and a second MANUAL UP detent with anti-trap disabled. The second MANUAL UP detent requires a higher operator force to reach actuation than the AUTO UP detent.

In accordance with the present invention, a method is provided for operating the switch assembly for an automobile window to implement an override of an anti-trap system when closing the window. The method comprises steps of disposing the switch assembly to have a plurality of distinct positions/modes representative to an operator of distinct window operations comprising an OFF position, a first UP position with anti-trap enabled and a second UP position with anti-trap disabled, first moving the switch from the OFF position to the first UP position to initiate closing of the window and second moving the switch from the first UP position to the second UP position to continue closing the window wherein the anti-trap system is disabled. The second moving requires a higher operator actuation force than the first moving.

One benefit obtained by the use of the present invention is a control system which allows implementation of an AUTO UP mode for the closing of an automobile window and includes an anti-trap protection against accidental pinching of obstructions in the window, but yet allows override of the anti-trap protection when desired.

A further benefit of the present invention is a control system which allows an operator to readily distinguish, with mere tactile sensitivity, a switch being in the state where anti-trap is enabled from the state where the anti-trap is disabled.

It also can protect in the normal or manual modes that the up window motion is not initiated if an obstacle is already present or detected or if the sensor test has failed.

Other benefits and advantages for the subject new switch assembly control system and method will become apparent to those skilled in the art upon a reading and understanding of this specification.

BRIEF DESCRIPTION OF THE DRAWINGS

The invention may take physical form in certain parts and arrangements of parts, and certain steps and arrangement of steps, the preferred embodiments of which are described in detail in this specification and illustrated in the accompanying drawings which form a part hereof and wherein.

DETAILED DESCRIPTION OF THE INVENTION

Figure 1:
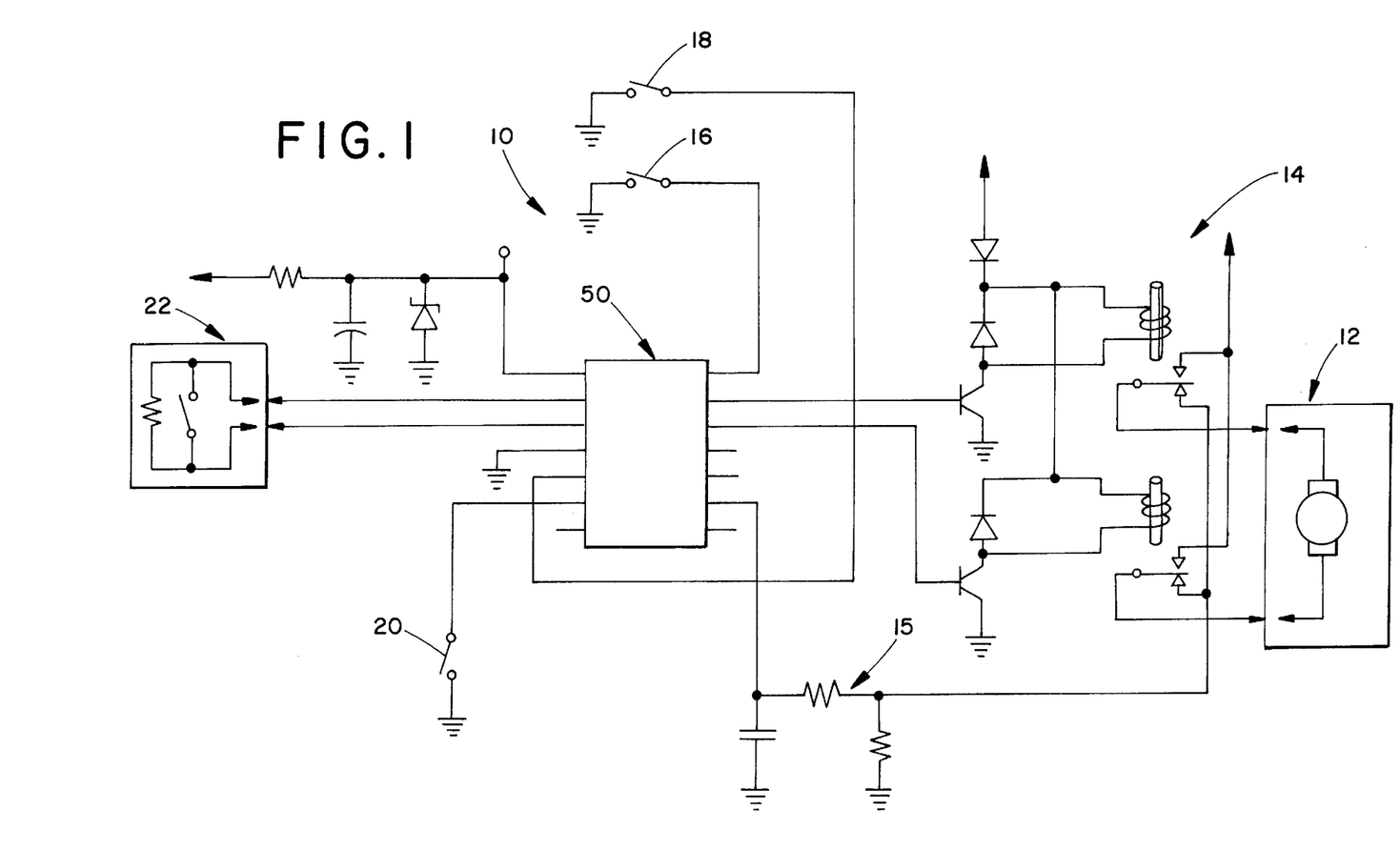
FIG. 1 is a schematic of a control circuit for controlling the operation of an automobile window in accordance with the present invention.

Referring now to the drawings wherein the showings are for purposes of illustrating the preferred embodiments of the invention only, and not for purposes of limiting same, FIG. 1 shows a control circuit 10 for controlling operation of a motor 12 for power opening and closing of a window in an automobile. Since power windows are well-known in autos, the specific operation of the motor including the details of the power switches 14 used for direct application of current thereto are not discussed in detail herein. However, the invention comprises novel control inputs and their processing to effect an improved window control system which allows an AUTO UP window operation with anti-trap protection, or with the anti-trap protection overridden. More particularly, operator inputs to the control system are effected by up/down switches 16, 18 and an anti-trap override switch 20. An additional input comes from the obstacle detect sensor 22, which can sense when an object is obstructing closing of the window, such as in an accidental placement of a finger between the window and the seal.

Figure 2A:
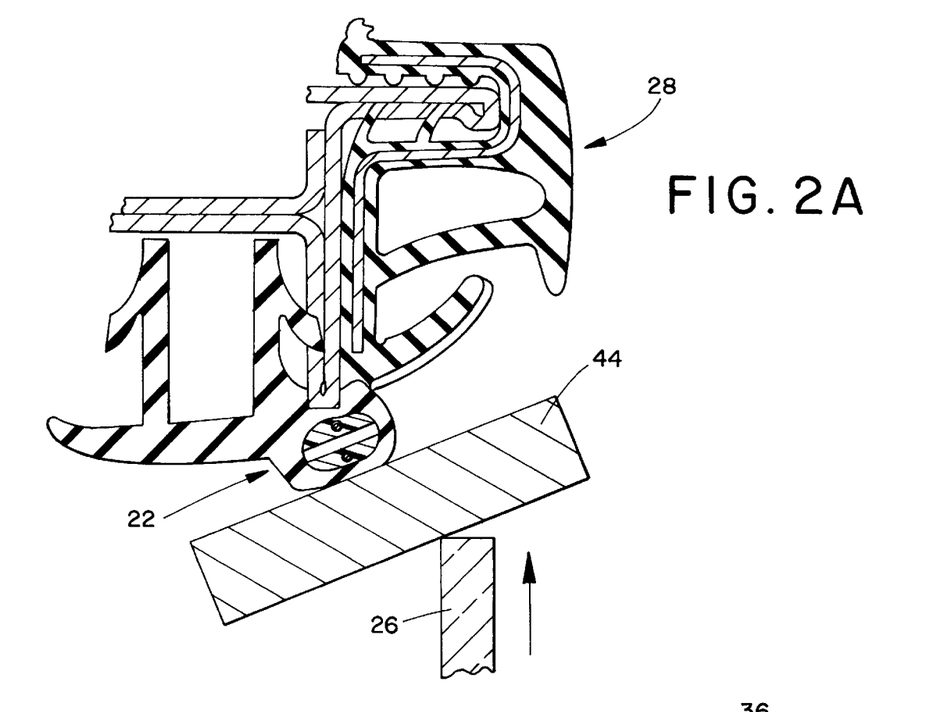
FIGS. 2A and 2B are partial cross-sectional views of a car door window frame particularly illustrating the sensor construction for sensing obstructions between the frame and the window while the window is being closed.
Figures 2B, 2C:
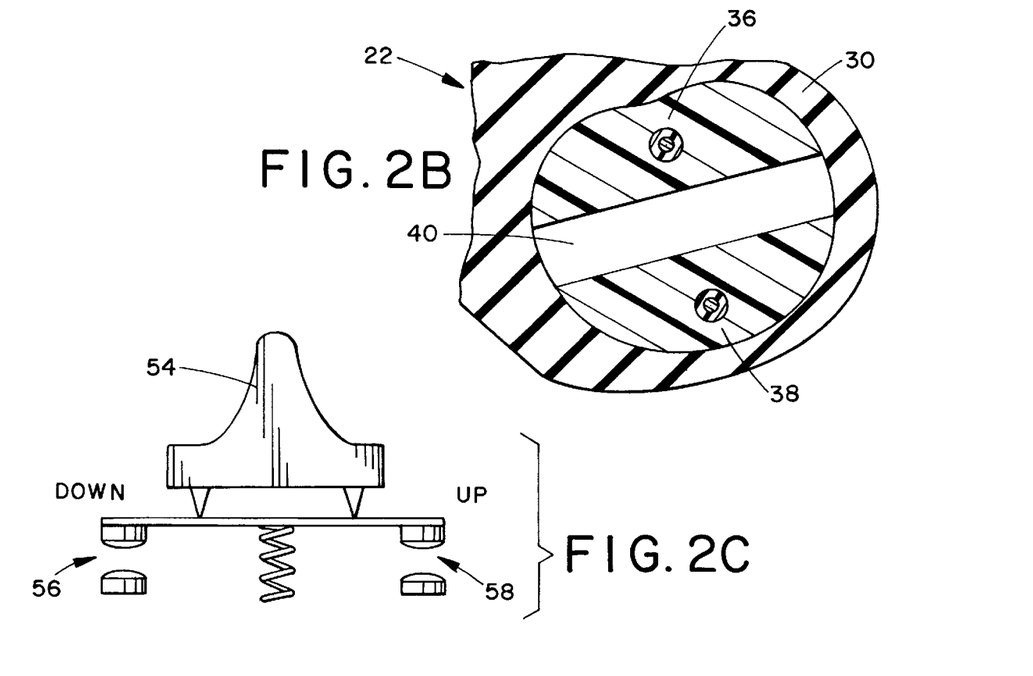
FIG. 2C is a switch that can be used by an operator to signal the various modes of window operation.

FIGS. 2A and 2B illustrate a window construction and the actual structure of the sensor 22. Window 26 is normally received in a door frame seal 28 without contacting the sensor switch 22, but when an obstruction is interposed between the top of the window and the seal 28, the sensor switch 22 is deformed to effectively cause the closing of the sensor switch which is recognizable by the control system as an anti-trap signal. More particularly, and with reference to FIG. 2B, sensor switch 22 comprises a flexible conduit 30 encasing spaced and opposed flexible wires 32 and 34 included in a casing of a conductive material 36, 38, respectively, and spaced by an air gap 40. As shown in FIG. 2A, when an obstruction 44 is trapped between the rising window 26 and the sensor 22, the profile of the deflectable casing will deform so that the two conductive materials 36, 38 connect, effectively decreasing the resistance of the sensor switch 22 in a manner that is detectable by the control system.

Turning back to FIG. 1, the inputs of the system are detected by a logic circuit 50, preferably comprising an ASIC (application specific integration circuit) or a processor, which can process the various input signals and control the motor 12 in a manner as will be detailed below.

The last input to the logic circuit 50 comprises a current sensor 15 which allows the logic circuit to determine when to disconnect power to the motor when a window reaches its end of travel so that it is fully opened or fully closed in an AUTO DOWN or AUTO UP operating mode (i.e., "stall"). In other words, when the window is fully closed, so that continued application of power to the motor will not cause any more resulting movement to the window, excessive heating or mechanical stress, a change in current to the motor is sensed and the logic circuit can disconnect the applied power.

With additional reference to FIG. 2C, the switches 16, 18 and 20 are physically embodied in a switch construction such as shown therein. With this implementation, when toggle 54 is tilted towards down contacts 56 so that the contacts are in electrical connection, down switch 18 is closed. Alternatively, if the toggle 54 is levered towards the up contacts 58 so that they contact, the up switch 16 is closed. If the toggle is pressed harder after either the up or down contacts are closed, then the opposing contact switch is also closed to obtain a second detent. The higher force required to actuate the second detent is easily recognizable by an operator and provides a safety feature. A third detent can be added in a similar fashion.

Figure 3A:
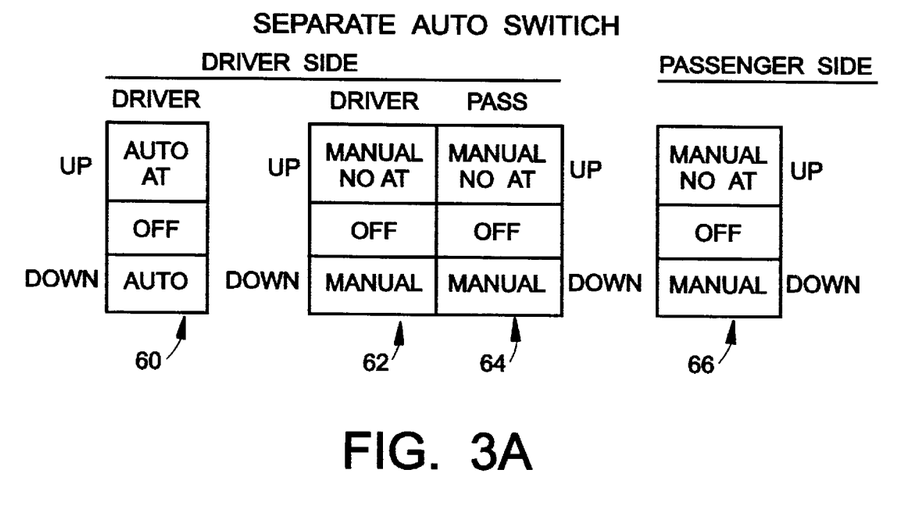
FIGS. 3A–3F show several embodiments of switch panel arrangements available on an automobile for implementing the subject invention; and, FIGS. 4A–4C comprise state diagrams for illustrating the various methods for implementing the invention.
Figure 3B:
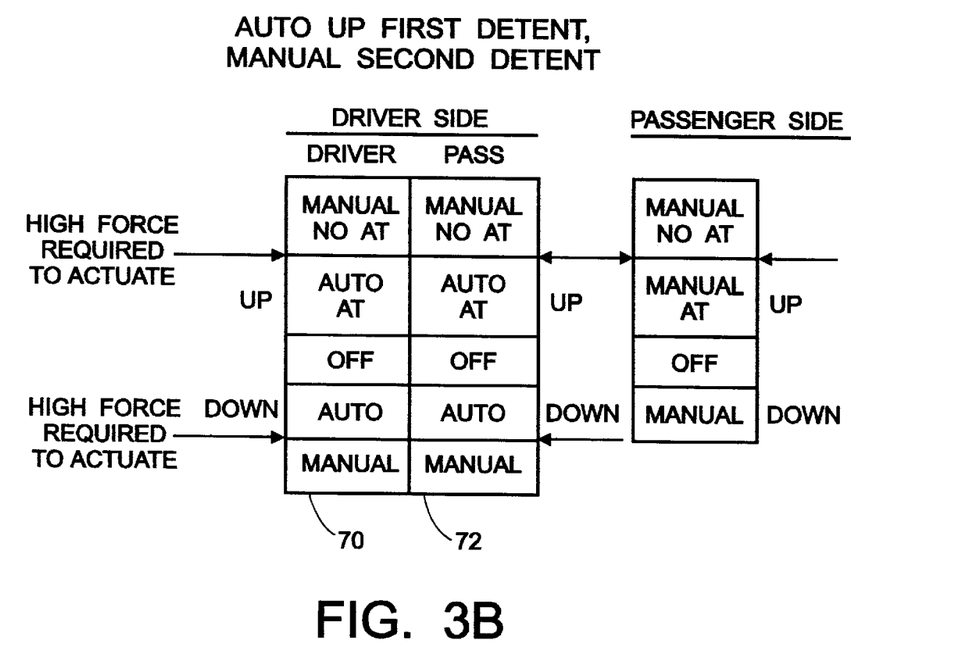
Figure 3C:
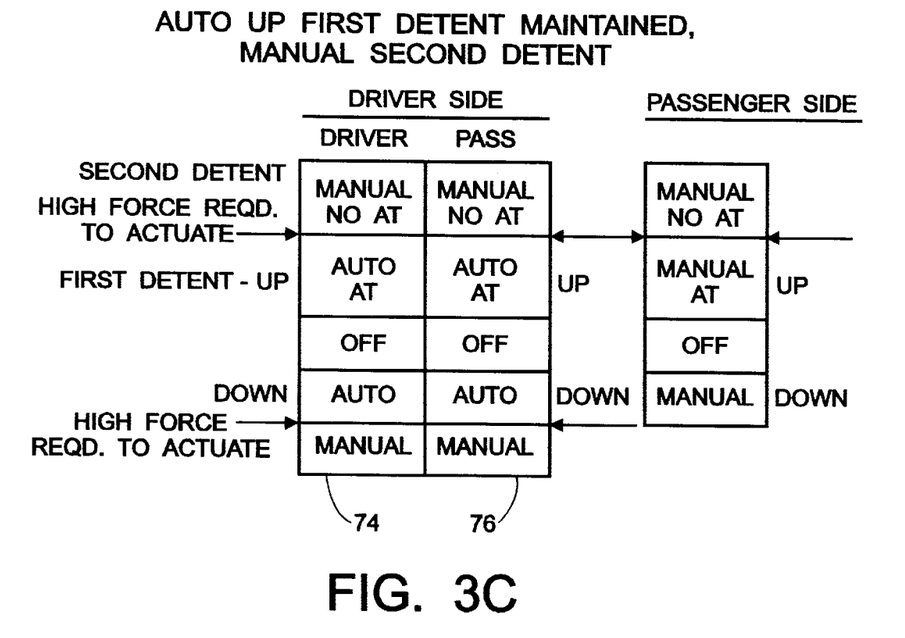

FIGS. 3A–3C shown various switch arrangements for the subject invention as it could be implemented in an actual vehicle. FIG. 3A shows a first embodiment comprised of toggles 60, 62, 64, 66. The driver's side switches 60, 62, 64 comprise a conventional control switch panel as is well known in that the driver can control both the driver window and the passenger window via toggling the switches to either UP or DOWN Switches 62, 64 and convey no AUTO UP or AUTO DOWN operation, nor have any anti-trap protection. The passenger side switch 66 is identical to switches 62, 64. FIG. 3A also illustrates a separately disposed auto switch 60 on the driver's side, wherein the driver can further implement an AUTO UP or AUTO DOWN operation mode for the window. It is to be noted that the AUTO UP mode also includes anti-trap protection. Separating the AUTO switches from the MANUAL switches 62, 64 allows the driver to safely and conveniently implement AUTO UP and AUTO DOWN, without confusing them with the manual operation switches. The physical configuration of the switches of this embodiment need not comprise the switch configuration of FIG. 2C, since only UP, DOWN and OFF are necessary to be signaled by any one switch.

FIG. 3B shows an alternative embodiment wherein the driver's side switches for the driver window and passenger window comprise a double detent system for signal communication and would implement a switch of the structure of the switch shown in FIG. 2C. In particular, switch 70 can toggle from OFF to either first detent positions corresponding to either UP or DOWN modes, respectively, and will operate the motor to implement an AUTO UP or AUTO DOWN of the window. The AUTO UP includes anti-trap protection, i.e., logic circuit 50 will monitor the sensor switch 22 during up power to the motor 12. The motor will operate until the window is sensed to be either fully open or fully closed or until the operator signals a stop, such as by the tapping of the switch to close contacts at a first detent position to correspond with either AUTO UP or AUTO DOWN. Implementing a MANUAL UP or MANUAL DOWN signal to the control system by a second toggling application of the switch 70, such as by closing both up and down contacts by pressing the switch with a relatively high force for actuation. Thus, the embodiment of FIG. 3B has the novelty of operating with an AUTO UP first detent position and a MANUAL UP second detent position which requires an operator to impose a higher force to actuate the switch to the second detent. Again, with reference to FIG. 2C, the first detent corresponds to a toggling of the sensor switch 22 to a position where either the up or down contacts are closed, while movement to the second detent comprises a pushing down of the switch to close both sets of contacts in a particular sequence.

FIG. 3C discloses a control panel for implementing a mode described as AUTO UP first detent maintained, manual second detent. In this embodiment, the switches shown in FIG. 2C will not accomplish this operation scheme unless the switch is designed to maintain its first toggle position. In the embodiment of FIG. 3C, switch 74 will maintain its position at either the AUTO UP with anti trap or AUTO DOWN positions until the driver physically returns the switch to the center OFF position. The second detent position discloses a MANUAL UP or MANUAL DOWN and the FIGURE emphasizes that the MANUAL UP position has no anti-trap protection. In addition, the MANUAL UP and MANUAL DOWN positions comprise second detent positions requiring a higher force to actuate than the AUTO positions.

Figure 3D:
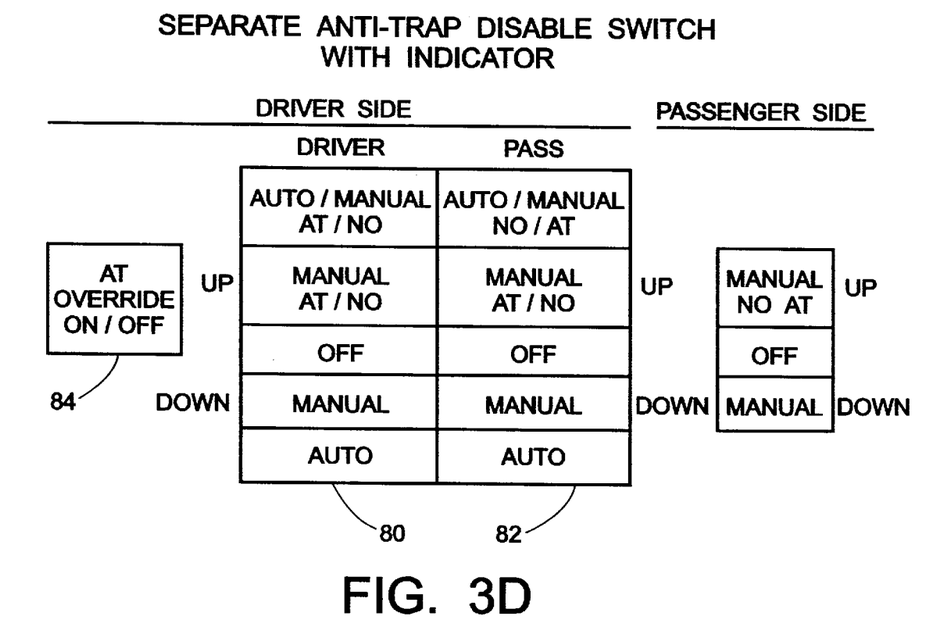

FIG. 3D shows a system where the driver's side toggles are arranged to have a center OFF position, first detents signaling MANUAL DOWN and MANUAL UP, and second detents indicating AUTO DOWN and AUTO UP. Again, the second detents require a higher force to operate than the first detent position. In addition, a separate anti-trap disable/override switch 84, corresponding to the anti-trap override switch 20 of FIG. 1 is disposed to conveniently allow the operator to turn ON or OFF the anti-trap protection of MANUAL UP. AUTO UP is disabled when anti-trap is disabled. In addition, switch 84 could be backlit when the override is on as an easily perceptible indicator to the operator.

Figure 3E:
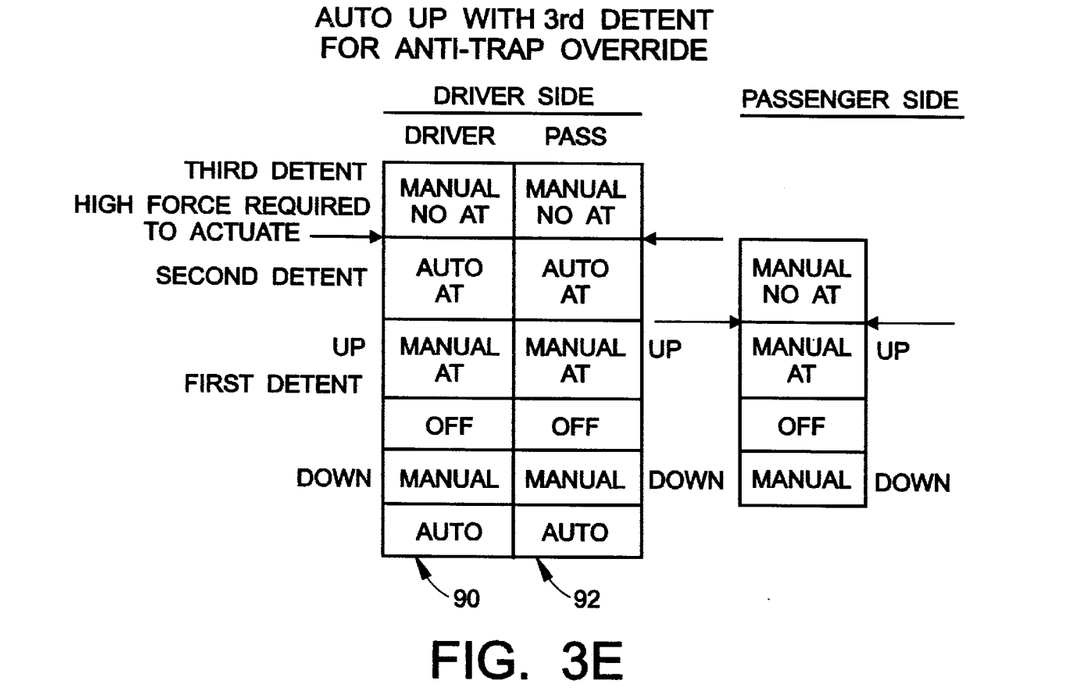

With reference to FIG. 3E, a driver side control panel including an MANUAL UP in a third detent position for anti-trap override is shown. More particularly, toggles 90, 92 are configured to have a center OFF position, an MANUAL DOWN position and a AUTO DOWN position. The UP positions comprise MANUAL UP with anti-trap protection, AUTO UP with anti-trap protection and MANUAL UP with no anti-trap protection.

Figure 3F:
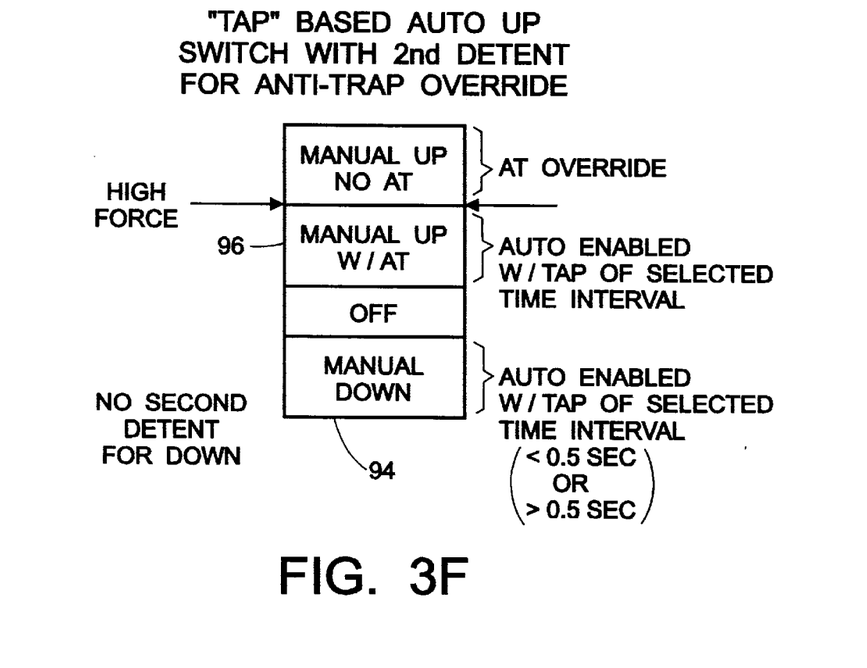

With reference to FIG. 3F, a "tap" based AUTO UP switch with second detent for anti-trap override is shown. The AUTO UP with anti-trap protection can be triggered using the toggle switch of FIG. 2C by employing a timer so that when the switch 54 is toggled for closing the up contacts for a certain period of time, it can be released by the operator and the window will continue to close with AUTO UP with anti-trap protection. In other words, the MANUAL UP with anti-trap enabled 96 can be converted to AUTO UP with anti-trap enabled by a tap of the switch 54 for a preselected time interval. To override the anti-trap protection, the toggle 54 must be compressed with a relatively higher force and a longer stroke so that both the up contacts and the down contacts are closed. The logic circuit will thus realize that the driver is indicating that the window should be closed while overriding the anti-trap protection.

Figure 4A:
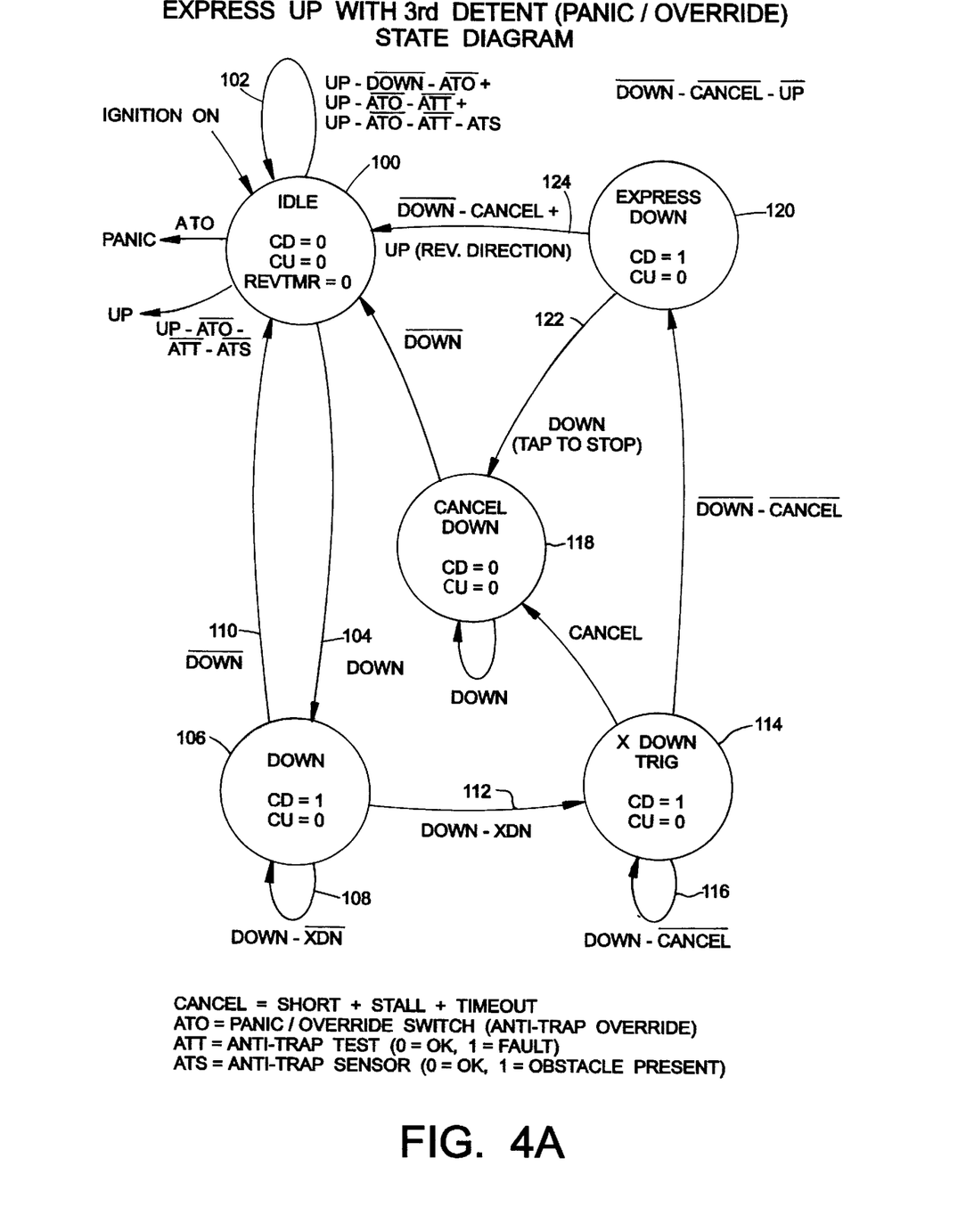
Figure 4B:
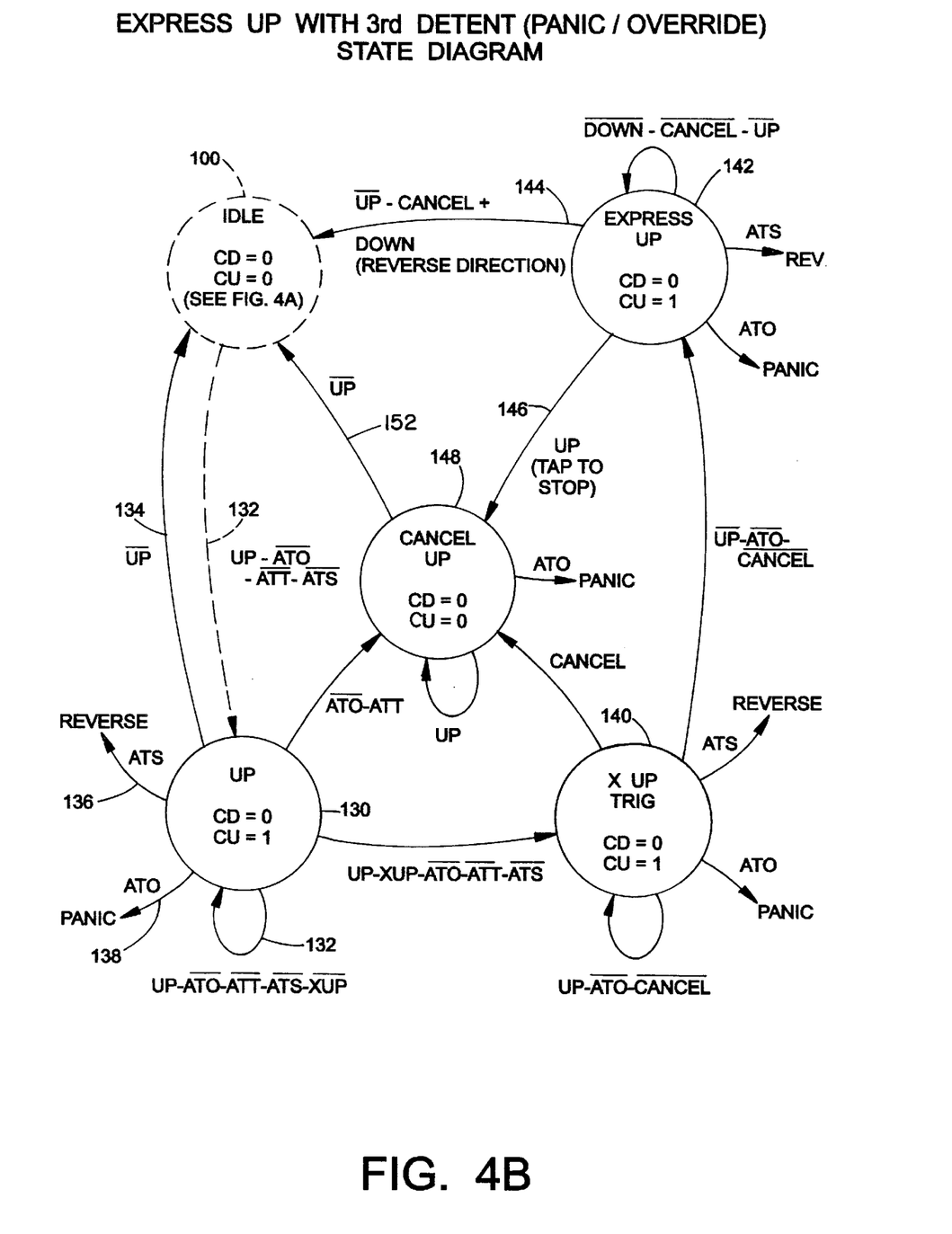
Figure 4C:
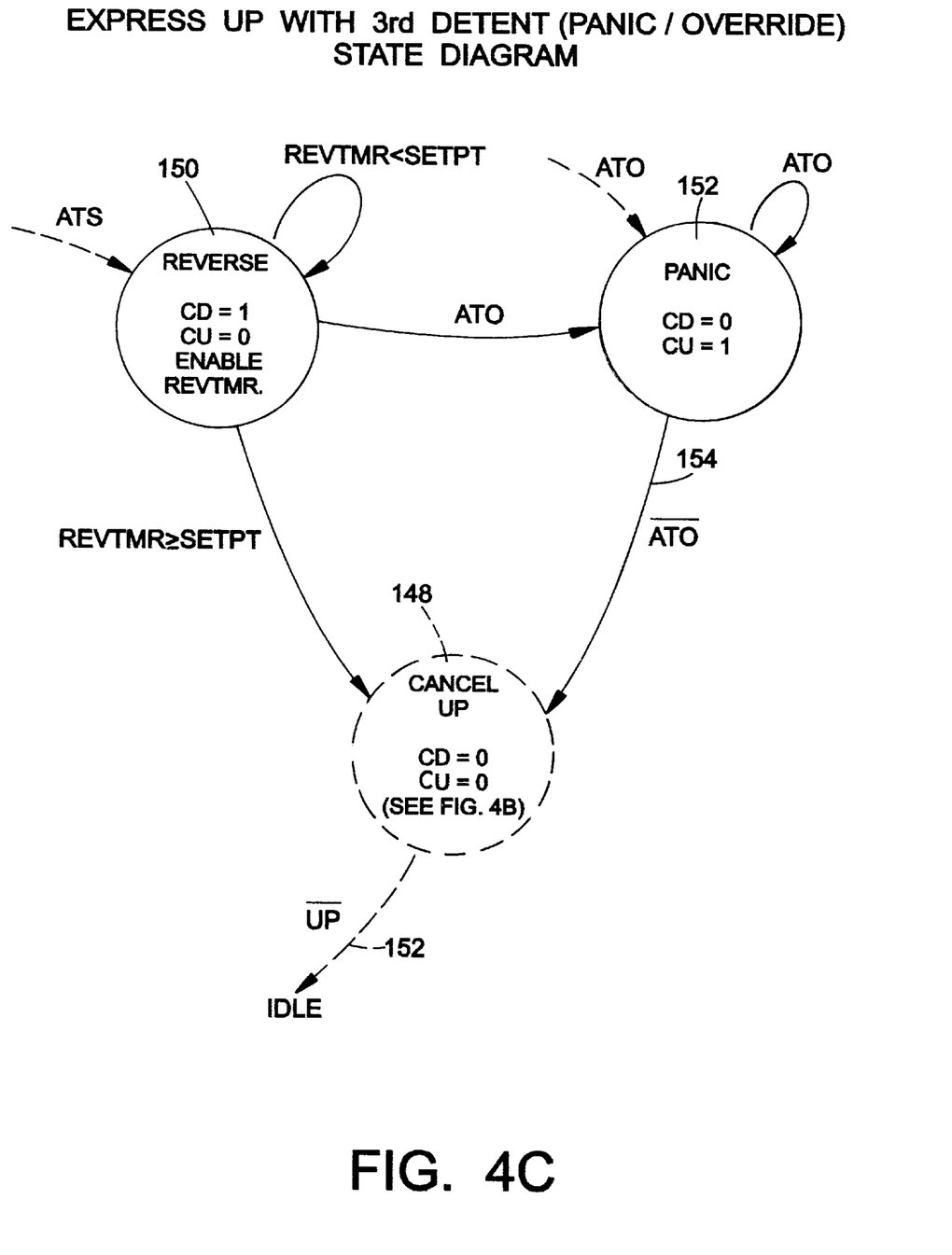

With attention to FIGS. 4A–4C, a state diagram illustrating the method for implementing the panel switch system of FIG. 3E is shown therein.

FIG. 4A relates to system operation during a window moving down, FIG. 4B relates to a window moving up and FIG. 4C relates to anti-trap or override conditions. Idle state 100 will occur after ignition ON and remain until either the up or down toggle contacts are closed by the operator. In the idle state, the coil is neither energized for down or up movement ("CD": coil down; "CU": coil up; "REVTMR": reverse direction timer). It also will remain idle, as further shown by returning loop 102, when the up contacts are closed if either an anti-trap test, i.e., operability test ("ATT") has failed or the anti-trap sensor ("ATS") detects an obstacle. In conventional state diagram form, when a line occurs over the state variable, it indicates that the state is not present (i.e., not true). Arrow 104 indicates when the operator has closed the down contacts to move to DOWN state 106 wherein a coil down signal is applied to the motor 12. The system will remain in the DOWN state 108 so long as the down signal is present and the EXPRESS DOWN signal ("XDN") is not present. The system will return to the idle state when the operator releases the down switch 110. If an EXPRESS DOWN (AUTO DOWN) trigger occurs 112, such as for example, the operator holding down the down contacts via the toggle for a preselected period of time, the system will move to an EXPRESS DOWN TRIGGERED STATE 114 and will return to the EXPRESS DOWN state 120 unless a cancel signal is received. The cancel signal is detected by the current sensor due to either a short or stall or a time-out period being sensed or executed by the logic circuit 50. Usually, the window closing will indicate a stall condition being recognized by the current sensor. From the EXPRESS DOWN state 120, the operator can cancel by tapping the up toggle 124 or the down toggle 122 or when a positive cancel signal is sensed 124.

FIG. 4B similarly comprises a state diagram illustrating the method of operating for the system when an up signal is received. From IDLE state 100, the window can be moved UP at state 130 manually when the operator indicates an up signal 132 and the system senses no obstacle. The system will remain in MANUAL UP as per loop 132 until the operator releases the up toggle 134 or until an obstruction is sensed 136 or a panic state is indicated overriding the anti-trap sensor 138. When an EXPRESS UP TRIGGER is sensed 140, the system will move into the EXPRESS UP (AUTO UP) state 142 and will remain there until either a cancel 144 or an operator stop signal 146 is sensed. It should be noted that in either the MANUAL UP state 130, the EXPRESS UP TRIGGER STATE 140, or the AUTO UP state 142, the system is in an anti-trap condition so that when an obstacle is sensed by the anti-trap sensor, the window will cease receiving the coil up signal, which will be more fully disclosed with reference to FIG. 4C. From a CANCEL state 148, usually being when the window is closed, the system will return to IDLE state 100.

With reference to FIG. 4C, operation of the system when sensing an obstruction in the window via the anti-trap sensor or operation under anti-trap override is illustrated. During any UP operation, when an anti-trap sensor detects an obstruction, the system will reverse the UP operation and will move DOWN until the reverse timer times out past a predetermined set point ("SETPT"). Thereafter, the system will move back to the CANCEL UP state 148 until the operator releases the UP switch 152 to return to IDLE state 100. Alternatively, when an operator wishes to override the anti-trap sensor, i.e, to close the window against an intruder or to close the window when some other physical obstruction is setting off the sensor, MANUAL with an anti-trap override ("ATO") occurs at state 152 and will remain until the operator terminates sending the override signal 154, such as by releasing the toggle.

The invention has been described with reference to the preferred embodiment. Obviously, modifications and alterations will occur to others upon a reading and understanding of the specification.

Having thus described our invention, we now claim:

1. A control system for an automobile window including anti-trap protection in an UP mode, comprising:
    a motorized drive assembly for drive assembly for driving the automobile window between open and closed;
    a sensor disposed to detect when an object is present between the automobile window and an automobile window frame and to transmit an anti-trap signal representative thereof, wherein the sensor is positioned adjacent a seal of the window frame;
    a switch assembly for communicating switch signals representative of commands from an operator by disposition of the switch assembly in selected distinct modes comprising positions or time intervals; and,
    a logic circuit disposed to receive the switch signals and the anti-trap signal and control the drive assembly in response thereto, wherein the switch assembly comprises at least a first switch moveable to said distinct modes comprising an OFF mode, a MANUAL DOWN mode, an AUTO DOWN mode, an AUTO UP mode with the anti-trap protection enabled, and a MANUAL UP mode with the anti-trap protection disabled.

2. The control system as defined in claim 1 wherein the switch assembly comprises said first switch and a second switch physically spaced from each other, the first switch comprising the AUTO DOWN mode, the OFF mode, and the AUTO UP mode with the anti-trap protection enabled, and the second switch comprising the MANUAL DOWN mode, the OFF mode and the MANUAL UP mode with the anti-trap protection disabled.

3. The control system as defined in claim 1 wherein the first switch has detent positions corresponding to said distinct modes and wherein an AUTO UP detent for said AUTO UP mode with the anti-trap protection enabled is interposed between an OFF detent for said OFF mode and a MANUAL UP detent for said MANUAL UP mode with the anti-trap protection disabled.

4. The control system as defined in claim 3 wherein said MANUAL UP detent requires the operator to apply higher force to reach actuation than said AUTO UP detent.

5. The control system as defined in claim 4 wherein said first switch includes means for maintaining the first switch in the AUTO modes until returned to the OFF mode by the operator.

6. The control system as defined in claim 1 wherein the switch assembly includes an override switch for selectively disabling operation of the anti-trap protection when said first switch is disposed in said MANUAL or AUTO UP modes.

7. The control system as defined in claim 6 wherein the override switch incudes an indicator for indicating the disabling of the operation of the anti-trap protection.

8. The control system as defined in claim 1 wherein said distinct modes further include a MANUAL UP mode with the anti-trap protecting disabled.

9. The control system as defined in claim 8 wherein the first switch has detent positions corresponding to said distinct modes, said detent positions comprising an OFF detent, a first detent for MANUAL UP with the anti-trap protection enabled, a second detent for AUTO UP with the anti-trap protection enabled, and a third detent for MANUAL UP with the anti-trap protection disabled.

10. The control system as defined in claim 9 wherein said third detent for MANUAL UP with the anti-trap protection disabled requires the operator to apply a higher force to reach actuation than said second detent for AUTO UP with the anti-trap protection enabled.

11. A control system for an automobile window including anti-trap protection in an UP mode, comprising:
    a motorized drive assembly for drive assembly for driving the automobile window between open and closed;
    a sensor disposed to detect when an object is present between the automobile window and an automobile window frame and to transmit an anti-trap signal representative thereof;
    a switch assembly for communicating switch signals representative of commands from an operator by disposition of the switch assembly in selected distinct modes comprising positions or time intervals; and,
    a logic circuit disposed to receive the switch signals and the anti-trap signal and control the drive assembly in response thereto, wherein the switch assembly comprises a switch moveable to said distinct modes, said distinct modes comprising an OFF mode, a MANUAL DOWN mode, an AUTO DOWN mode, an AUTO UP mode with the anti-trap protection enabled, a MANUAL UP mode with the anti-trap protection enabled and a MANUAL UP mode with the anti-trap protection disabled.

12. The control system as defined in claim 11 wherein said switch has detent positions corresponding to said distinct modes and wherein the switch comprises at least a detent position for MANUAL UP mode with the anti-trap protection disabled and a detent position for AUTO UP mode with the anti-trap protection enabled, and wherein the detent position for MANUAL UP mode with the anti-trap protection disabled requires the operator to apply higher force to reach actuation than said detent for AUTO UP mode with the anti-trap protection enabled.

13. The control system as defined in claim 11 wherein said switch assembly is moveable from said MANUAL UP mode with the anti-trap protection enabled to said AUTO UP mode with the anti-trap protecting enabled by the operator tapping the switch assembly for a preselected time interval.

14. A method of operating a switch assembly for an automobile window to implement an override of an anti-trap system when closing the window, the method comprising steps of:

disposing the switch assembly to have a plurality of distinct positions representative to an operator of distinct window operations comprising an OFF mode, a first UP mode with anti-trap enabled and a second UP mode with anti-trap disabled, first moving the switch from the OFF position to the first UP position to initiate closing of the window, and, second moving the switch from the first UP position to the second UP position to continue closing the window wherein the anti-trap system is disabled.

15. The method as claimed in claim 14 wherein the second moving requires a higher operator actuation force than said first moving.

* * * * *